Dec. 29, 1953 J. D. SPRADLIN ET AL 2,664,523
ELECTROMAGNETIC DEFLECTION GENERATOR
Filed Nov. 30, 1951
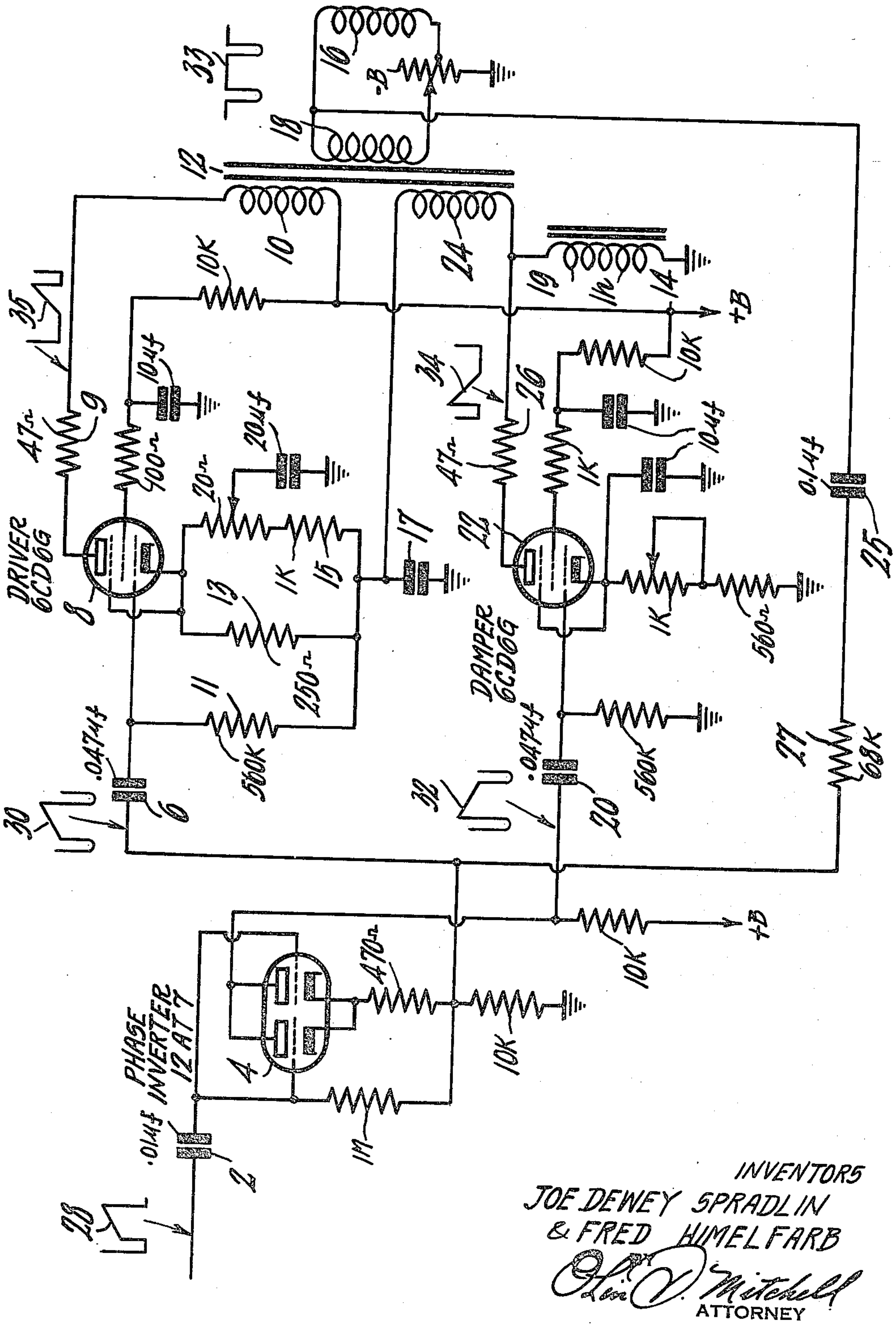
INVENTORS
JOE DEWEY SPRADLIN
& FRED HIMELFARB
Oliver D. Mitchell
ATTORNEY Patented Dec. 29, 1953

2,664,523

UNITED STATES PATENT OFFICE 2,664,523

ELECTROMAGNETIC DEFLECTION GENERATOR

Joe Dewey Spradlin, Mount Ephraim, N. J., and Fred Himelfarb, Brooklyn, N. Y., assignors to Radio Corporation of America, a corporation of Delaware Application November 30, 1951, Serial No. 259,102

9 Claims. (Cl. 315—27)

This invention relates to an improvement in deflection generators for deflecting a cathode ray beam in a cathode ray tube. More particularly, the invention relates to power recovery systems whereby normally unused power may be recovered from the horizontal, or line, cathode ray beam deflection circuit of a television receiver or other unit utilizing a cathode ray device to scan a target area or to reproduce an image of any sort on such an area.

Electromagnetic deflection of a cathode ray beam is frequently employed in apparatus using cathode ray tubes particularly where the deflection frequency remains substantially constant. When electromagnetically deflecting a cathode ray beam where the rate of deflection is uniform, it is necessary to cause the flux to alter its density in a linear manner. Accordingly, this requires a linear change in the amount of current that is permitted to flow through the electromagnetic deflection yoke coil since the flux produced by the yoke is substantially in direct proportion to the amount of current in the coil of the yoke throughout its normal range of current variation.

It is customary practice in cathode ray beam deflecting circuits to provide an electron discharge tube having relatively high power output for supplying current to the beam deflecting coils. The electron discharge tube and the beam deflecting yoke coils are usually transformer-coupled. A so-called damping tube is connected across the primary of the transformer, or across the deflecting coils. This tube is conventionally represented as comprising an inverted diode the purpose of which is to eliminate any high frequency oscillations which would otherwise be set up in the deflecting coils, and also to aid in the deflection of the cathode ray beam during a part of each deflection cycle.

The inverted diode serves as a periodic discharge path for the electromagnetic energy stored in the deflecting coils or other circuit inductance at the end of the deflection cycle. In the absence of the diode, this stored energy would normally produce relatively high frequency oscillations in the system, with the result that the deflection of the cathode ray beam during the initial part of its deflection cycle would be non-linear. When the diode is used as a damper tube, only ½ cycle of free oscillation is permitted to take place, and thereafter the energy contained in the deflecting coils or other circuit inductance is used for the initial part of the next useful deflection cycle. In addition, the damper obtains energy which is commonly known as reclaimed energy. Reclaimed energy is employed to increase the amount of power available for application to the load circuit.

Linearity of scanning has become of extreme importance under certain conditions. In order to improve linearity of deflection, it has been discovered that a linear summation characteristic is obtainable by modifying the characteristics of the inverted diode or damper tube. To permit such modification, the diode is replaced by a triode or multi-grid electron discharge tube, so that voltage variations of a particular waveform may be applied to the control electrode of the discharge tube to alter its conduction characteristics. The United States Patent No. 2,332,822 to Otto H. Schade shows a power tube and a controlled damper tube which produce a linear summation characteristic.

The control voltage variations applied to the control electrode of the damper tube are usually sawtooth voltages of opposite polarity to the sawtooth voltage which is applied to the power or driver tube and this control voltage may be derived by feeding a sawtooth voltage into a phase inverter. The same varying component of current in the phase inverter exists in the plate and cathode resistors but the potential at the cathode with respect to ground increases when the potential at the plate decreases and vice versa. By a proper choice of resistors in the plate and cathode circuits the alternating voltage potential at the cathode and plate may be made equal in magnitude but opposite in polarity.

In accordance with this invention, the net D.-C. magnetization of the core in the deflection output transformer is greatly reduced by sending the primary winding D.-C. current through an auxiliary winding associated with the damper tube in such a direction as to cancel the net D.-C. magnetization set up in the core by the primary winding D.-C. current.

It is a primary object of this invention to reduce the D.-C. magnetization of the transformer core in an electromagnetic deflection circuit.

Another object of this invention is to provide an improved electromagnetic deflection circuit.

Still another object of this invention is to reduce losses in a high frequency magnetic deflection circuit.

A further object of this invention is to increase the deflection efficiency in a television deflection circuit.

It is a still further object of this invention to improve the linearity of the horizontal deflection in a cathode ray tube.

A further purpose of this invention is to reduce the cost of high frequency magnetic deflection circuits.

Other objects and advantages of this invention will be apparent from the following detailed description when taken in conjunction with the accompanying drawing which illustrates by circuit diagram an electromagnetic deflection circuit arranged in accordance with the present invention.

Referring to the drawing, a condenser 2 is connected to the control grids of phase inverter 4. Condenser 6 is connected between a point in the cathode circuit of phase inverter 4 and the control grid of driver tube 8. Cathode bias and grid resistors 11, 13, and 15 are connected to one side of condenser 17. The other side of condenser 17 is connected to ground. A choke coil 19 is connected from the plate of damper tube 22 through resistor 26 to ground. An auxiliary winding 24 of transformer 12 is connected between the cathode circuit of driver tube 8 and the anode circuit of damper tube 22. Auxiliary winding 24 is polarized to cancel the D.-C. magnetization of the plate current of driver tube 8. One end of primary winding 10 of transformer 12 is connected to the plate of driver tube 8 through resistor 9 and the other end is connected to terminal 14 of a source of positive potential. The horizontal deflecting coil 16 is connected to the secondary winding 18 of transformer 12. A feedback network consisting of capacitor 25 and resistor 27 is connected to secondary winding 18 and a point in the cathode circuit of phase inverter 4. Condenser 20 is placed between the plates of phase inverter 4 and the control grid of damper tube 22. The drawing shows the actual values of the circuit elements and tube numbers that have been used successfully in practice.

In operation of this circuit, a sawtooth voltage 28 is applied to the control grids of phase inverter 4 through condenser 2. From a point in the cathode circuit of phase inverter 4 where deflection voltage 33 is mixed with voltage 28, a voltage 30 similar to voltage 28 is applied to the control grid of driver tube 8 through condenser 6. From the plate of phase inverter 4, a voltage 32 of opposite polarity to voltage 30 is applied to the control grid of damper tube 22 through condenser 20. Driver tube 8 and damper tube 22 are controlled by voltages 30 and 32 respectively which have negative pulses in the same direction, but constant slopes in opposite direction. The negative pulses in the same direction keep both tubes 8 and 22 cut off during the retrace period and permits the use of a larger portion of the damper tube grid characteristic. During the last half of the period of deflection of the beam, the variable component of current 35 through driver tube 8 and its associated winding 10 is increasing while the variable component of current 34 through damper tube 22 and its associated winding 24 is essentially zero. At the end of the deflection period the control electrode of driver tube 8 is driven sufficiently negative with respect to the cathode to cut off the flow of current in driver tube 8. Energy stored during the conduction of driver tube 8 in the inductances of transformer 12 and deflecting coil 16 causes the circuit comprised of transformer 12 and deflecting coil 16 together with associated stray and distributed capacitances to oscillate at the natural resonant frequency of said circuit. Retrace of the beam is controlled by the high frequency oscillations which are set up in the said circuit. At the end of one-half cycle of oscillation, the sawtooth voltage 32 reduces the potential difference between the control electrode and the cathode of damper tube 22 and thus places damper tube 22 in a state of high conduction. Further oscillation in transformer 12 and deflecting coil 16 is prevented by the damping action of damper tube 22. The rate of decrease of the variable component of current 34 in winding 24 and damper tube 22 is controlled by voltage 32 and results in a uniform rate of change of current in horizontal deflecting coil 16. This uniform rate of change of current causes a linear decrease in flux density in deflecting coil 16 which in turn causes the cathode ray beam in a cathode ray tube to travel at a uniform rate from one extremity of its excursion toward the center of the tube. As the cathode ray beam approaches the center of the cathode ray tube, the energy stored in the magnetic circuits approaches zero. In order to continue the travel of the cathode ray beam toward the opposite extremity of its excursion, current flow is initiated in driver tube 8 and winding 10 by voltage 30 on the control electrode. The current in driver tube 8 and winding 10 increases during the remainder of the deflection period causing a uniform rate of increase of current in deflecting coil 16. This uniform increase of current in deflecting coil 16 causes a linear increase in flux density which in turn causes a uniform rate of deflection of the cathode ray beam toward the said opposite extremity of travel. Shortly, after current flow is initiated in driver tube 8, damper tube 22 is cut off and is maintained in a non-conducting state during the remainder of the deflection period. By properly controlling the tube characteristics, the transition of conduction between damper tube 22 and driver tube 8 can be made uniform.

The required power is supplied to driver tube 8 from a source of potential at terminal 14. The plate voltage for damper tube 22 consists of the $$L\frac{di}{dt}$$

voltage developed across auxiliary winding 24 of transformer 12. Windings 10 and 24 of transformer 12 may have the same number of turns.

In order to secure proper circuit operation without saturating the core, heretofore high quality tape-wound grain-oriented cores capable of operating at high flux densities had to be used in transformer 12. Circuit efficiency was impaired due to large core losses at high flux density.

According to this invention the D.-C. magnetizing force due to the difference in plate currents of driver tube 8 and damper tube 22 are cancelled.

It can be seen from the circuit drawing that the average or direct-current component of the current flowing in winding 10 and driver tube 8 also flows through winding 24 and thence to ground through parallel paths consisting of damper tube 22 and choke 19. Thus the plate current of driver tube 8 plus a small amount of screen current of driver tube 8 flows through auxiliary winding 24 of transformer 12 in such a direction as to cancel the D.-C. magnetization due to driver tube 8 plate current in primary winding 10. Choke coil 19 offers a low resistance path to direct current so that the sum of the plate current of damper tube 22 and the current through choke coil 19 equals the cathode current of driver tube 8.

By operating with very nearly zero D.-C. magnetization, the maximum flux density requirements of the core material can be reduced by a factor of approximately 6 to 1. Therefore, low-cost ferrite cores can be substituted for the expensive tape-wound core. The cost of ferrite cores for both transformer 12 and choke coil 19 is approximately ⅓ the cost of the tape-wound core for transformer 12 alone. Choke coil 19 consists of a thin coil on a ferrite core. Since its inductance is relatively high compared to the reflected load inductance at the plate of damper tube 22, no appreciable loading effect is produced on the circuit.

A reduction of losses in transformer 12 will increase the amount of stored energy at the end of the retrace period. Hence, damper tube 22 can be made to operate over a longer portion of the deflection period and thus reduce the required conduction period of driver tube 8. Reduction of the conduction period of driver tube 8 results in a reduction of the amount of power required from the source of positive potential applied to the terminal of winding 10. Losses in the circuit are reduced in two ways, first, the losses of ferrite cores are inherently lower than losses in iron core, and second, core losses are smaller because flux densities are smaller. In color camera horizontal deflection circuits which have operated very satisfactorily, the efficiency was increased in the following manner: D.-C. input power was reduced from 46 watts to 32 watts and scanning current amplitude was increased from 1800 milliamperes peak-to-peak to 2200 milliamperes peak-to-peak.

Linearity is improved because the output transformer is operated over a more linear portion of the magnetization curve.

Having thus described our invention, what we claim and desire to secure by Letters Patent is:

1. An electromagnetic deflection scanning circuit comprising in combination a yoke coil, a driver tube, a damper tube, and a transformer having separate windings connected to each of said yoke coil, said driver tube, and said damper tube, said windings of said transformer connected respectively to said driver tube and said damper tube being connected in series with respect to direct current and polarized such that the direct current magnetization caused by said damper tube winding opposes the direct current magnetization caused by said driver tube winding.

2. The invention as described in claim 1 and wherein said damper tube has a control electrode.

3. The invention as set forth in claim 1 and wherein said winding connected to said driver tube and said winding connected to said damper tube have an equal number of turns.

4. An electromagnetic deflection scanning circuit comprising in combination a yoke coil, a driver tube, a damper tube and a transformer having a primary winding connected to said driven tube, a secondary winding connected to said coil and an auxiliary winding connected to said damper tube, said primary and auxiliary windings of the transformer being in series with respect to direct current and polarized such that the direct current magnetization caused by the winding coupling said driver tube to said transformer is cancelled out in another of said windings.

5. An electromagnetic deflection circuit comprising, a drive tube having at least an anode, a cathode and a control electrode; a damper tube having at least an anode, a cathode and a control electrode; a horizontal deflecting coil; means including a multi-winding transformer with core to couple said coil to said driver tube and to said damper tube; means including a series D.-C. interconnection between predetermined windings of said transformer through said driver tube to minimize the D.-C. magnetization of said core, said D.-C. interconnection being of a character to produce substantially equal and opposite fluxes in said core in response to direct current flow in said driver tube and in said predetermined windings; and means to prevent alternating current flow through said D.-C. interconnection.

6. An electromagnetic deflection scanning circuit comprising in combination, a yoke coil, a driver tube, a damper tube, a choke coil, a source of potential, a multi-winding transformer having a core, said transformer arranged to couple said yoke coil, said driver tube and said damper tube, a D.-C. circuit including said choke coil, said driver tube, a first and a second predetermined winding of said transformer, and said source of potential, one end of said first predetermined winding being interconnected to the cathode of said driver tube and the other end of said first predetermined winding being connected to the junction of the anode of said damper tube and one end of said choke coil, the other end of said choke coil being connected to ground, one end of said second predetermined winding being connected to the plate of said driver tube and the other end of said second winding being connected to said terminal from said source of potential, such that said first predetermined winding produces substantially equal and opposite fluxes in said core of said transformer in response to said D.-C. current flow in said driver tube and in said predetermined windings.

7. In a reaction scanning deflection circuit, a driver tube having at least an anode, a cathode, and a control electrode, a condenser, means for connecting one end of said condenser to said cathode of said driver tube and the other end of said condenser to ground, a damper tube, a terminal from a source of potential, a choke coil connected from said plate of said damper tube to ground, a deflecting coil, a transformer with core having a primary, a secondary and an auxiliary winding, said primary winding connected at one end to said plate of said driver tube and the other end to said potential terminal, said secondary winding connected directly across said deflecting coil, said auxiliary winding connected at one end to said cathode of said driver tube and at the other end to said plate of said damper tube, said primary and said auxiliary windings being of opposite polarity when direct current flows through said driver tube and said primary and said auxiliary windings.

8. A magnetic deflection circuit in a television system comprising, a phase inverter having two output terminals, a driver tube having at least an anode, a cathode, and a control electrode, means for connecting said control electrode of said driver tube to one output terminal of said phase inverter, a condenser, means for connecting one end of said condenser to said cathode of said driver tube and the other end of said condenser to ground, a damper tube having at least an anode, a cathode, and a control electrode, means for connecting said control electrode of said damper tube to the other output terminal of said phase inverter, a terminal from a source of potential, a choke coil connected from said plate of said damper tube to ground, a deflecting coil, a transformer with core having a primary, a secondary, and an auxiliary winding, said deflecting coil coupled to said driver tube and said damper tube by means of said transformer, said primary winding connected at one end to said plate of said driver tube and the other end to said potential terminal, said secondary winding connected directly across said deflecting coil, and said auxiliary winding connected at one end to said cathode of said driver tube and at the other end to said plate of said damper tube, whereby said primary and said auxiliary windings have opposite polarity when D.-C. current flows through said driver tube and said primary and said auxiliary windings.

9. An electron ray beam deflection system employing a source of deflection voltage having at least a sawtooth component comprising, a phase inverter having a plate output terminal, and a cathode output terminal, a driver tube having at least an anode, a cathode, and a control electrode, means for connecting said control electrode of said driver tube to said cathode output terminal of said phase inverter, a damper tube having at least an anode, a cathode, and a control electrode, means for connecting said control electrode of said damper tube to said plate output terminal of said phase inverter, a condenser, means for connecting one end of said condenser to said cathode of said driver tube and the other end of said condenser to ground, a terminal from a source of potential, a choke coil connected from said plate of said damper tube to ground, a deflecting coil, a transformer with core having a primary, a secondary and an auxiliary winding, said deflecting coil coupled to said driver tube and said damper tube by means of said transformer, said primary winding connected at one end to said plate of said driver tube and the other end to said potential terminal, said secondary winding connected directly across said deflecting coil, and said auxiliary winding connected at one end to said cathode of said driver tube and at the other end to said plate of said damper tube, such that said primary and said auxiliary windings have opposite polarity when D.-C. current flows through said driver tube and said primary and said auxiliary windings.

JOE DEWEY SPRADLIN.
FRED HIMELFARB.

References Cited in the file of this patent

UNITED STATES PATENTS

| Number | Name | Date |
|---|---|---|
| 2,315,073 | Norton | Mar. 30, 1943 |
| 2,382,822 | Schade | Aug. 14, 1945 |
| 2,414,546 | Nagel | Jan. 21, 1947 |
| 2,467,699 | Richards | Apr. 19, 1949 |
| 2,478,744 | Clark | Aug. 9, 1949 |
| 2,512,305 | Clapp | June 20, 1950 |
| 2,559,512 | Morgan | July 3, 1951 |